(12) United States Patent
Ogawa et al.

(10) Patent No.: US 10,516,179 B2
(45) Date of Patent: Dec. 24, 2019

(54) FUEL CELL SYSTEM AND METHOD OF CONTROLLING THE SAME

(71) Applicant: TOYOTA JIDOSHA KABUSHIKI KAISHA, Toyota-shi, Aichi-ken (JP)

(72) Inventors: Tomohiro Ogawa, Miyoshi (JP); Tsuyoshi Maruo, Okazaki (JP); Shun Matsumoto, Toyota (JP); Hiroyuki Tsunekawa, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 81 days.

(21) Appl. No.: 15/944,038

(22) Filed: Apr. 3, 2018

(65) Prior Publication Data

US 2018/0294493 A1 Oct. 11, 2018

(30) Foreign Application Priority Data

Apr. 6, 2017 (JP) ................. 2017-075779

(51) Int. Cl.
*H01M 8/04* (2016.01)
*H01M 8/0438* (2016.01)
*H01M 8/04089* (2016.01)
*H01M 8/04119* (2016.01)
*H01M 8/04223* (2016.01)
(Continued)

(52) U.S. Cl.
CPC ....... *H01M 8/04425* (2013.01); *H01M 8/043* (2016.02); *H01M 8/0432* (2013.01); *H01M 8/04097* (2013.01); *H01M 8/04156* (2013.01); *H01M 8/04179* (2013.01); *H01M 8/04253* (2013.01); *H01M 8/04753* (2013.01); *H01M 8/2475* (2013.01); *H02M 3/155* (2013.01);
(Continued)

(58) Field of Classification Search
CPC ............ H01M 8/04425; H01M 8/043; H01M 8/04156; H01M 8/04179; H01M 8/04097; H01M 8/0432; H01M 8/04753
See application file for complete search history.

(56) References Cited

U.S. PATENT DOCUMENTS

| | | | | |
|---|---|---|---|---|
| 2011/0244350 A1* | 10/2011 | Okuyoshi | ......... | H01M 8/04179 429/429 |
| 2012/0189925 A1* | 7/2012 | Matsusue | .......... | H01M 8/04223 429/414 |
| 2016/0141685 A1* | 5/2016 | Toida | ................ | H01M 8/04761 429/444 |

FOREIGN PATENT DOCUMENTS

| | | |
|---|---|---|
| JP | 2005-209609 A | 8/2005 |
| JP | 2007-005289 | 1/2007 |

(Continued)

*Primary Examiner* — Stewart A Fraser
(74) *Attorney, Agent, or Firm* — Finnegan, Henderson, Farabow, Garrett & Dunner, LLP

(57) ABSTRACT

A fuel cell system includes a fuel cell stack having a plurality of cells each having hydrogen channels, a hydrogen channel inlet, and a hydrogen channel outlet, a load supplied with power from the fuel cell stack, a circulation passage connecting the channel inlet with the channel outlet, a hydrogen pump provided in the circulation passage, and a controller. The controller rotates the hydrogen pump in a positive direction so as to feed the hydrogen gas in a first amount into each cell through the channel inlet, at a flow rate larger than a minimum flow rate required for power generation, and then rotate the hydrogen pump in a negative direction so as to feed the hydrogen gas into each cell through the channel outlet, during a period from stop of power supply to the load, to the next start of power supply.

7 Claims, 3 Drawing Sheets

(51) Int. Cl.
  *H01M 8/0432*  (2016.01)
  *H01M 8/04746*  (2016.01)
  *H01M 8/2475*  (2016.01)
  *H02M 3/155*  (2006.01)
  *H01M 8/043*  (2016.01)
  *H01M 8/1018*  (2016.01)

(52) U.S. Cl.
  CPC .............. *H01M 8/04776* (2013.01); *H01M 2008/1095* (2013.01)

(56) References Cited

FOREIGN PATENT DOCUMENTS

| | | |
|---|---|---|
| JP | 2007-242381 | 9/2007 |
| JP | 2010-282821 | 12/2010 |

\* cited by examiner

FUEL CELL SYSTEM AND METHOD OF CONTROLLING THE SAME

INCORPORATION BY REFERENCE

The disclosure of Japanese Patent Application No. 2017-075779 filed on Apr. 6, 2017 including the specification, drawings and abstract is incorporated herein by reference in its entirety.

BACKGROUND

1. Technical Field

The disclosure relates to a fuel cell system and a method of controlling the fuel cell system.

2. Description of Related Art

A fuel cell system having a fuel cell stack that consists of a plurality of fuel cells stacked together is known. Each of the fuel cells has a membrane electrode assembly sandwiched between separators. According to a technology described in Japanese Patent Application Publication No. 2010-282821 (JP 2010-282821 A) for preventing water from standing in a hydrogen channel outlet of each cell, when electric power generation is stopped, a pump for circulating hydrogen is driven in a direction opposite to that in which the pump is driven during power generation, so as to remove water that clogs the hydrogen channel outlet.

SUMMARY

When the hydrogen pump is driven in the opposite direction, a hydrogen channel inlet of each cell may be clogged with water. If the water clogging the hydrogen channel inlet freezes, hydrogen gas is not introduced into the cell, which may result in a shortage of hydrogen and deterioration of the fuel cell. Therefore, a technology that can prevent the hydrogen channel inlet and hydrogen channel outlet of the fuel cell from being clogged with water has been desired.

A first aspect of the disclosure is concerned with a fuel cell system including: a fuel cell stack having a plurality of cells each having hydrogen channels through which hydrogen gas flows, a hydrogen channel inlet that allows the hydrogen gas to flow into the hydrogen channels, and a hydrogen channel outlet that allows the hydrogen gas to flow out from the hydrogen channels; a main load to which electric power is supplied from the fuel cell stack; a circulation passage that connects the hydrogen channel inlet with the hydrogen channel outlet, such that the hydrogen gas supplied to the fuel cell stack is circulated through the circulation passage; a hydrogen pump provided in the circulation passage and configured to rotate in a selected one of a positive direction corresponding to a normal feeding direction of the hydrogen gas, and a negative direction opposite to the positive direction; and a controller configured to control the hydrogen pump. The controller is configured to rotate the hydrogen pump in the positive direction so as to feed the hydrogen gas in a predetermined first hydrogen amount into each of the cells through the hydrogen channel inlet, at a first hydrogen flow rate that is larger than a minimum hydrogen flow rate required for power generation, and then rotate the hydrogen pump in the negative direction so as to feed the hydrogen gas in a second hydrogen amount that is smaller than the first hydrogen amount, into each of the cells through the hydrogen channel outlet, during a period from the time when supply of electric power from the fuel cell stack to the main load is stopped, to the time when supply of electric power to the main load is started next time. In the fuel cell system according to this aspect, the controller rotates the hydrogen pump in the positive direction so as to feed hydrogen gas into each of the cells, and then rotates the hydrogen pump in the negative direction so as to feed hydrogen gas into each of the cells. Therefore, water in the cell can be moved to a middle portion of the cell, and the hydrogen channel inlet and hydrogen channel outlet of the cell can be prevented from being clogged with water.

At least one of the hydrogen channel inlet and the hydrogen channel outlet may be composed of a plurality of straight flow channels that are arranged in parallel at regular intervals. With this arrangement, the straight flow channels arranged at regular intervals can be prevented from being clogged.

The ratio of the first hydrogen flow rate at which the hydrogen gas is fed during rotation of the hydrogen pump in the positive direction, to the minimum hydrogen flow rate required for power generation in the fuel cell system, may be in a range of 1.5 to 3.0, where the minimum hydrogen flow rate is taken as 1. With this arrangement, the treatment time can be shortened.

A second hydrogen flow rate at which the hydrogen gas is fed during rotation of the hydrogen pump in the negative direction may be larger than the first hydrogen flow rate during rotation of the hydrogen pump in the positive direction. With this arrangement, the treatment time can be shortened.

The controller may rotate the hydrogen pump in the negative direction for a shorter length of time than that of rotation of the hydrogen pump in the positive direction. With this arrangement, the treatment time can be shortened.

A second aspect of the disclosure is concerned with a method of controlling a fuel cell system. The fuel cell system includes a fuel cell stack having a plurality of cells each having hydrogen channels through which hydrogen gas flows, a hydrogen channel inlet that allows the hydrogen gas to flow into the hydrogen channels, and a hydrogen channel outlet that allows the hydrogen gas to flow out from the hydrogen channels, a main load to which electric power is supplied from the fuel cell stack, a circulation passage that connects the hydrogen channel inlet with the hydrogen channel outlet, such that the hydrogen gas supplied to the fuel cell stack is circulated through the circulation passage, and a hydrogen pump provided in the circulation passage and configured to rotate in a selected one of a positive direction corresponding to a normal feeding direction of the hydrogen gas, and a negative direction opposite to the positive direction. The method includes rotating the hydrogen pump in the positive direction so as to feed the hydrogen gas in a predetermined first hydrogen amount into each of the cells through the hydrogen channel inlet, at a hydrogen flow rate that is larger than a minimum hydrogen flow rate required for power generation, during a period from a time when supply of electric power from the fuel cell stack to the main load is stopped, to a time when supply of electric power to the main load is started next time, and then rotating the hydrogen pump in the negative direction so as to feed the hydrogen gas in a second hydrogen amount that is smaller than the first hydrogen amount, into each of the cells through the hydrogen channel outlet, during the period.

The disclosure may be realized in various forms. For example, the disclosure may be realized in the form of stationary power-generating equipment including a fuel cell system, a vehicle including a fuel cell system, a method of controlling a fuel cell system, and so forth.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Embodiment

Figure 1:
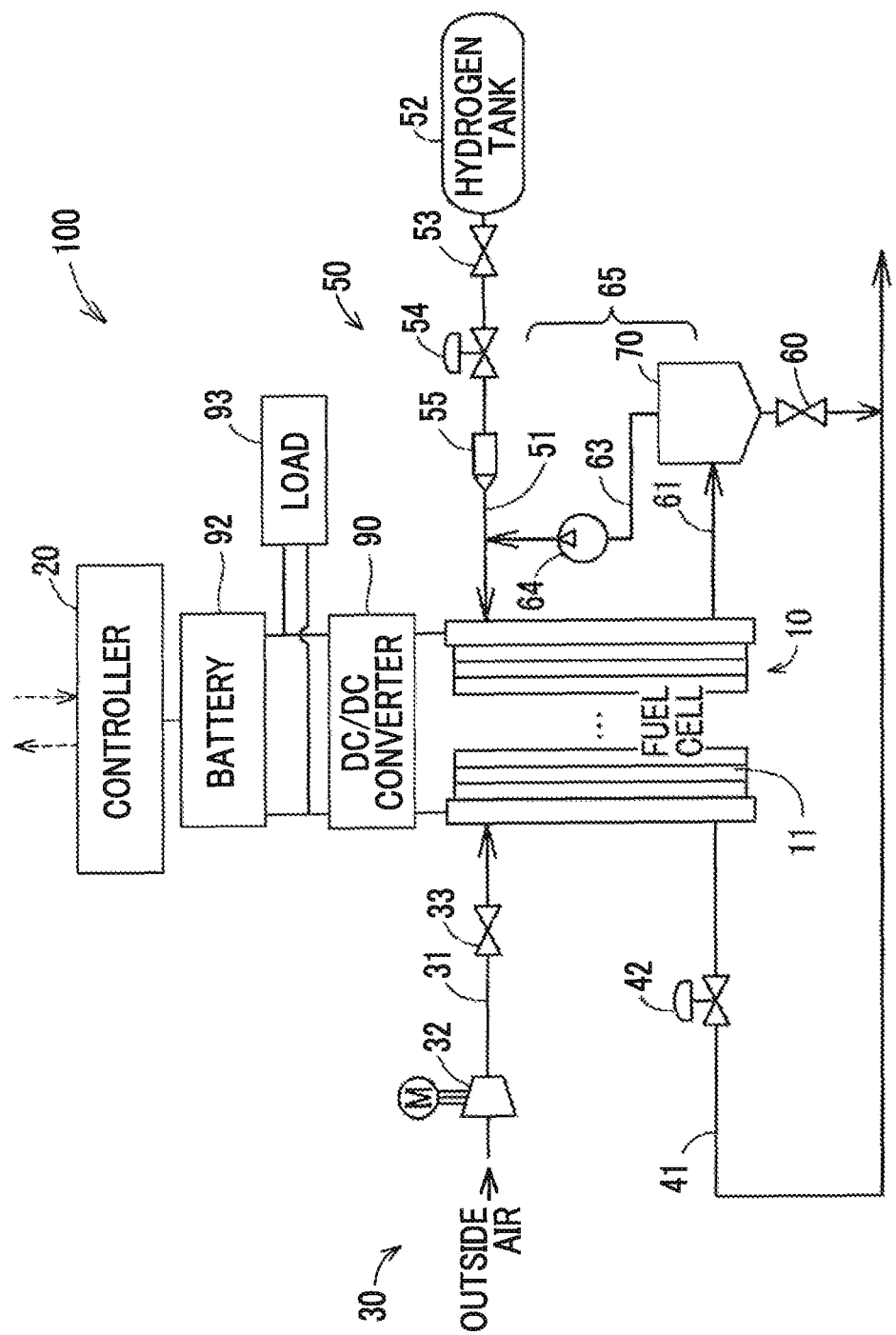
FIG. 1 is a schematic view showing the general configuration of a fuel cell system.

FIG. 1 is a schematic view showing the general configuration of a fuel cell system 100 according to one embodiment of the disclosure. The fuel cell system 100 includes a fuel cell stack 10, a controller 20, an oxidizing gas passage system 30, and a fuel gas passage system 50. The fuel cell system 100 also includes a DC/DC converter 90, a battery 92, and a main load 93. The fuel cell system 100 of this embodiment is installed on a fuel cell vehicle, for example.

The fuel cell stack 10 is a polymer electrolyte fuel cell that is supplied with hydrogen gas as reaction gas and air (oxidizing gas), so as to generate electric power. The fuel cell stack 10 has a stack structure in which a plurality of cells 11 is stacked together. Each of the cells 11 has a membrane electrode assembly (not shown) including electrodes placed on opposite surfaces of an electrolyte membrane (not shown), and a pair of separators between which the membrane electrode assembly is sandwiched. The electric power generated by the fuel cell stack 10 is transmitted to a battery 92 via a DC/DC converter 90, and stored in the battery 92.

Various loads are connected to the battery 92. Examples of the various loads include a traction motor for driving wheels (not shown), an air compressor 32, a hydrogen pump 64, and various valves, which will be described later. The fuel cell stack 10 and the battery 92 can supply electric power to the loads. In this embodiment, the traction motor is an example of the main load 93. The traction motor may be regarded as "main load" of this disclosure. The air compressor 32, hydrogen pump, 64, various valves, etc. are accessories for operating the fuel cell stack 10, and do not correspond to the main load 93.

The oxidizing gas passage system 30 includes an oxidizing gas pipe 31, air compressor 32, first switching valve 33, cathode offgas pipe 41, and a first regulator 42. The oxidizing gas passage system 30 includes cathode-side flow channels within the fuel cell stack 10.

The air compressor 32 is connected to the fuel cell stack 10 via the oxidizing gas pipe 31. The air compressor 32 compresses air taken in from the outside, and supplies it to the fuel cell stack 10 as oxidizing gas, according to a control signal from the controller 20.

The first switching valve 33 is provided between the air compressor 32 and the fuel cell stack 10, and opens and closes according to flow of supplied air in the oxidizing gas pipe 31. More specifically, the first switching valve 33 is normally in a closed state, and opens when the air having a given pressure is supplied from the air compressor 32 to the oxidizing gas pipe 31.

The cathode offgas pipe 41 discharges cathode offgas discharged from the cathodes of the fuel cell stack 10, to the outside of the fuel cell system 100. The first regulator 42 regulates the pressure of the cathode offgas in the cathode offgas pipe 41 (i.e., the cathode-side back pressure of the fuel cell stack 10), according to a control signal from the controller 20.

The fuel gas passage system 50 includes a fuel gas pipe 51, hydrogen tank 52, second switching valve 53, second regulator 54, injector 55, exhaust/drain valve 60, anode offgas pipe 61, circulation pipe 63, hydrogen pump 64, and a gas-liquid separator 70. The fuel gas passage system 50 includes anode-side flow channels within the fuel cell stack 10. In the following description, a passage that consists of a portion of the fuel gas pipe 51 downstream of the injector 55, anode-side flow channels in the fuel cell stack 10, anode offgas pipe 61, circulation pipe 63, and the gas-liquid separator 70 will be referred to as a circulation passage 65. The circulation passage 65 is provided for circulating the anode offgas of the fuel cell stack 10 through the fuel cell stack 10.

The hydrogen tank 52 is connected to the anodes of the fuel cell stack 10 via the fuel gas pipe 51, and supplies hydrogen that fills the interior of the tank 52, to the fuel cell stack 10. The second switching valve 53, second regulator 54, and the injector 55 are provided in the fuel gas pipe 51, to be arranged in this order from the upstream side, namely, from the side closer to the hydrogen tank 52.

The second switching valve 53 opens and closes according to a control signal from the controller 20, and controls flow of hydrogen from the hydrogen tank 52 to the upstream side of the injector 55. The second switching valve 53 is closed when the fuel cell system 100 is stopped. The second regulator 54 regulates the pressure of hydrogen on the upstream side of the injector 55, according to a control signal from the controller 20. The injector 55 is an electromagnetically driven switching valve having a valve body that is electromagnetically driven, according to a drive cycle and a valve-opening duration set by the controller 20. The controller 20 controls the drive cycle and valve-opening duration of the injector 55, so as to control the amount of hydrogen supplied to the fuel cell stack 10.

The anode offgas pipe 61 connects an outlet of the anodes of the fuel cell stack 10 with the gas-liquid separator 70. The anode offgas pipe 61 guides anode offgas containing hydrogen gas and nitrogen gas that were not used for generation of electric power, to the gas-liquid separator 70.

The gas-liquid separator 70 is connected to between the anode offgas pipe 61 and the circulation pipe 63 of the circulation passage 65. The gas-liquid separator 70 separates water as an impurity from the anode offgas in the circulation passage 65, and reserves the water.

The circulation pipe 63 is connected to a portion of the fuel gas pipe 51 downstream of the injector 55. The hydrogen pump 64 that is driven according to a control signal from the controller 20 is provided in the circulation pipe 63. The anode offgas separated from water by the gas-liquid separator 70 is fed into the fuel gas pipe 51, by means of the hydrogen pump 64. The hydrogen pump 64 is able to reverse the feeding direction of gas, according to the direction of rotation of its drive shaft. For example, a rotary pump, such as a roots pump, may be used as the hydrogen pump 64. In this embodiment, rotation of the hydrogen pump 64 in such a direction as to feed the anode offgas into the fuel gas pipe 51 will be called "positive rotation", and rotation in a direction opposite to that of the positive rotation will be called "negative rotation". In the following description, the direction in which the hydrogen pump 64 is rotated so as to feed the anode offgas into the fuel gas pipe 51 will be called "positive direction", and the direction opposite to the positive direction will be called "negative direction".

In the fuel cell system 100, the anode offgas containing hydrogen is circulated, and supplied again to the fuel cell stack 10, for improvement of the hydrogen use efficiency. In the following description, not only the hydrogen gas supplied from the hydrogen tank 52, but also the anode offgas containing hydrogen, from which water has been separated, will be called "hydrogen gas".

The exhaust/drain valve 60 is provided below the gas-liquid separator 70. The exhaust/drain valve 60 performs drainage of water reserved in the gas-liquid separator 70, and discharge of the anode offgas in the gas-liquid separator 70. During operation of the fuel cell system 100, the exhaust/drain valve 60 is normally closed, and is opened and closed according to a control signal from the controller 20. In this embodiment, the exhaust/drain valve 60 is connected to the cathode offgas pipe 41, and the water and anode offgas discharged via the exhaust/drain valve 60 is discharged to the outside through the cathode offgas pipe 41.

In this embodiment, when power generation of the fuel cell system 100 is stopped, the controller 20 rotates the hydrogen pump 64 in the positive direction, so as to feed hydrogen gas to the fuel cell stack 10 in a predetermined hydrogen amount, and then rotates the hydrogen pump 64 in the negative direction, so as to feed hydrogen gas to the fuel cell stack 10 in an amount smaller than the predetermined hydrogen amount. In this embodiment, "stop of generation of electric power" means a condition where supply of electric power to the main load is stopped, in other words, a condition where traveling of the vehicle is stopped.

The controller 20 is in the form of a computer including CPU, memory, and an interface circuit to which respective components as described above are connected. The CPU executes control programs stored in the memory, so as to control electric power generation performed by the fuel cell system 100, and also controls the hydrogen pump 64 so as to perform anode purge treatment that will be described later, during stop of power generation of the fuel cell system 100.

Figure 2:
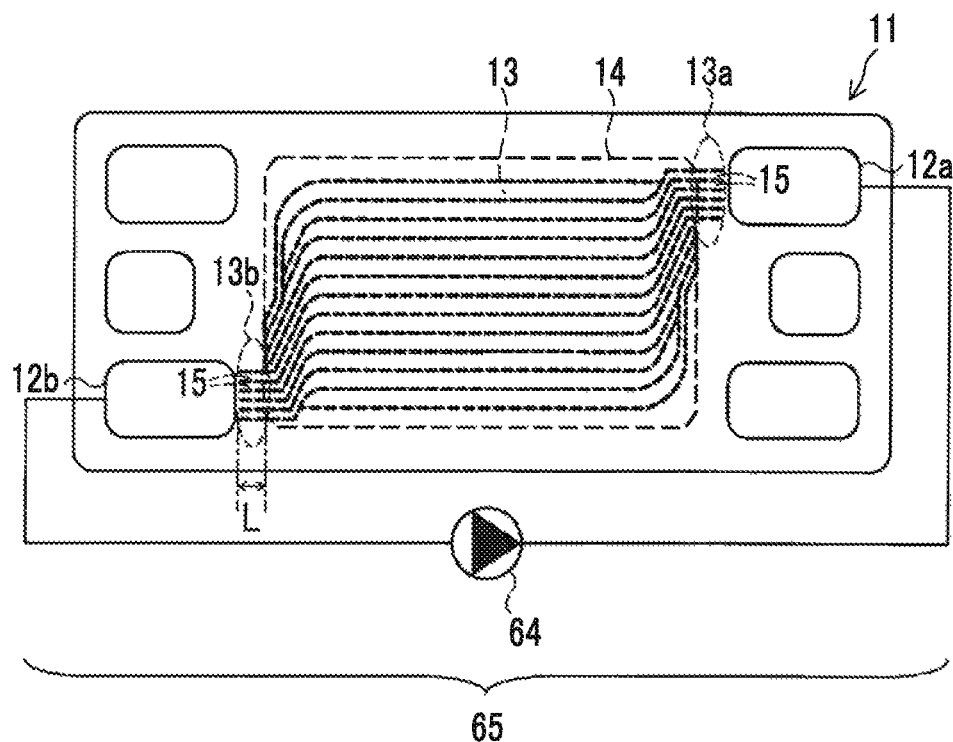
FIG. 2 is a plan view of a cell.

FIG. 2 is a plan view of a cell 11 in this embodiment. The cell 11 includes a manifold 12a, manifold 12b, hydrogen channels 13, hydrogen channel inlet 13a through which hydrogen gas flows into the hydrogen channels 13, and a hydrogen channel outlet 13b through which hydrogen gas flows out from the hydrogen channels 13. The manifold 12a and the manifold 12b are formed in a peripheral edge of the cell 11. In the cell 11, reaction gas (hydrogen gas) flows from the manifold 12a through the hydrogen channels 13, to be passed through the membrane electrode assembly 14, and is discharged from the manifold 12b. The hydrogen gas flows from the manifold 12a into the hydrogen channel inlet 13a, passes through the hydrogen channels 13, and is discharged from the hydrogen channel outlet 13b to the manifold 12b. The hydrogen channel inlet 13a and the hydrogen channel outlet 13b, in which water in the hydrogen gas concentrates, is likely to be closed. The hydrogen channel inlet 13a and the hydrogen channel outlet 13b are connected to the circulation passage 65 via the manifold 12a and the manifold 12b, respectively.

In this embodiment, the peripheries of the manifold 12a and the manifold 12b have comb-teeth-shaped structures. More specifically, straight flow channels 15 are arranged in parallel at regular intervals at the peripheries of the manifold 12a and the manifold 12b, to thus form the hydrogen channel inlet 13a and the hydrogen channel outlet 13b. The comb-teeth shape makes it possible to reduce or eliminate variations in pressure loss when the reaction gas is introduced into the cell 11.

Figure 3:
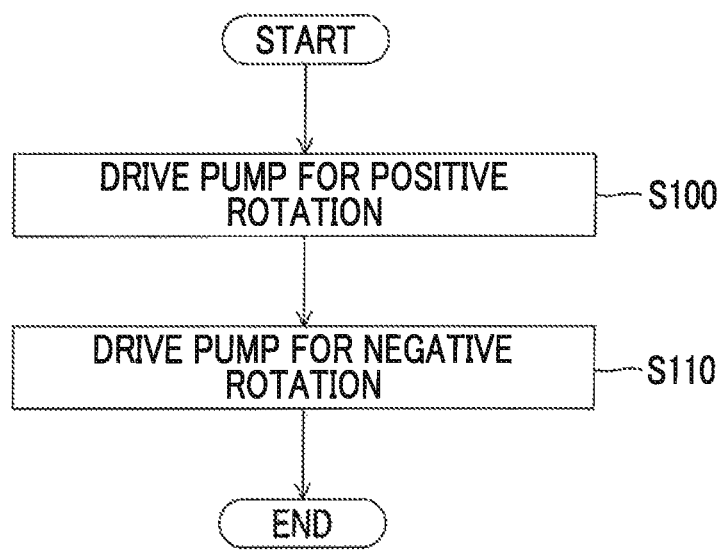
FIG. 3 is a flowchart generally illustrating anode purge treatment.

FIG. 3 is a flowchart illustrating the outline of anode purge treatment for discharging unnecessary water from the fuel gas passage system 50. The anode purge treatment is carried out during stop of power generation of the fuel cell system 100, more specifically, from the time when supply of electric power from the fuel cell stack 10 to the main load 93 is stopped, to the time when supply of electric power to the main load 93 is started next time. In this embodiment, the controller 20 executes the anode purge treatment immediately after power generation of the fuel cell system 100 is stopped. For example, when a start switch of the fuel cell vehicle is turned off, power generation of the fuel cell system 100 is stopped. The controller 20 monitors the start switch of the fuel cell vehicle, and initiates the anode purge treatment when it determines that the switch is turned off.

In the anode purge treatment of this embodiment, the controller 20 drives the hydrogen pump 64 for positive rotation, after closing the second switching valve 53, injector 55, and the exhaust/drain valve 60, so as to feed hydrogen gas in the circulation passage 65 into the cell 11 (step S100).

Figure 4:
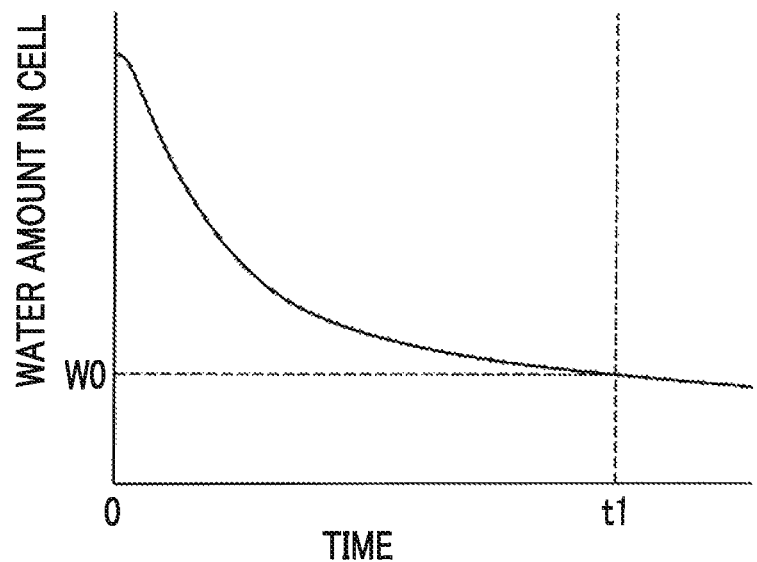
FIG. 4 is a graph showing change of the water amount in a cell due to driving of a hydrogen pump.

FIG. 4 is a graph showing change of the amount of water in the cell 11 due to driving of the hydrogen pump 64. In the graph of FIG. 4, the vertical axis indicates the amount of water in the cell 11, and the horizontal axis indicates time. The controller 20 rotates the hydrogen pump 64 in the positive direction for time t1 (sec.) at a hydrogen flow rate Q1 (L/min) that makes the amount of water in the cell 11 equal to the water amount W0 within time t1, so as to feed hydrogen gas into the cell 11 through the hydrogen channel inlet 13a. As a result, as shown in FIG. 4, the amount of water in the cell 11 is gradually reduced.

The water amount W0 in the cell 11 can be defined by empirically obtaining in advance the amount of water that will not clog the hydrogen channel inlet 13a when the hydrogen pump 64 is driven to rotate in the negative rotation as described later. The value obtained by multiplying the hydrogen flow rate Q1 by time t1 may be regarded as "hydrogen amount" of this disclosure.

Where the minimum hydrogen flow rate required for electric power generation in the fuel cell system 100 is taken as 1, the ratio of the hydrogen flow rate Q1 to the minimum hydrogen flow rate required for power generation preferably exceeds 1 for reduction of the treatment time. A ratio of hydrogen flow rate to the minimum hydrogen flow rate required for power generation will be referred to as "stoichiometric ratio". The stoichiometric ratio of the hydrogen flow rate Q1 is preferably equal to or larger than 1.5, and more preferably, is equal to or larger than 2.0. Also, in order to suppress excessive drying in the cell 11, the stoichiometric ratio of the hydrogen flow rate Q1 is preferably equal to or smaller than 3.0, and more preferably, is equal to or smaller than 2.5. In this embodiment, the stoichiometric ratio of the hydrogen flow rate Q1 is equal to 2.25, and time t1 is 60 sec.

Then, after stopping the hydrogen pump 64, the controller 20 drives the hydrogen pump 64 for negative rotation, so as to feed hydrogen gas into the cell 11 through the hydrogen channel outlet 13b, in an amount smaller than the hydrogen amount used in step S100 (step S110). More specifically, the controller 20 rotates the hydrogen pump 64 in the negative direction for time t2 at a hydrogen flow rate Q2, so as to feed hydrogen gas into the cell 11. It is preferable that the hydrogen flow rate Q2 is larger than the hydrogen flow rate Q1, so as to cause water that clogs the hydrogen channel outlet 13b to move swiftly toward middle portions of the hydrogen channels 13. In this embodiment, time t2 is set to be shorter than time t1 so that the hydrogen amount in step S110 becomes smaller than the hydrogen amount (hydrogen flow rate Q1×time t1) in step S100. In this embodiment, the stoichiometric ratio of the hydrogen flow rate Q2 is equal to 2.5, and time t2 is 10 sec. The value of time t2 is preferably larger than a value represented by the following expression (1).

$$(L/V) + \alpha \quad (1)$$

where L is the length (see FIG. 2) of the hydrogen channel outlet 13b, V is the flow rate or velocity of hydrogen gas, and $\alpha$ is a correction value based on experiments and/or actual measurements.

After completing the operation of step S110, the controller 20 opens the exhaust/drain valve 60 for a given period of time, so that water is discharged from the gas-liquid separator 70. Through the above process, the anode purge treatment is completed.

Figure 5:
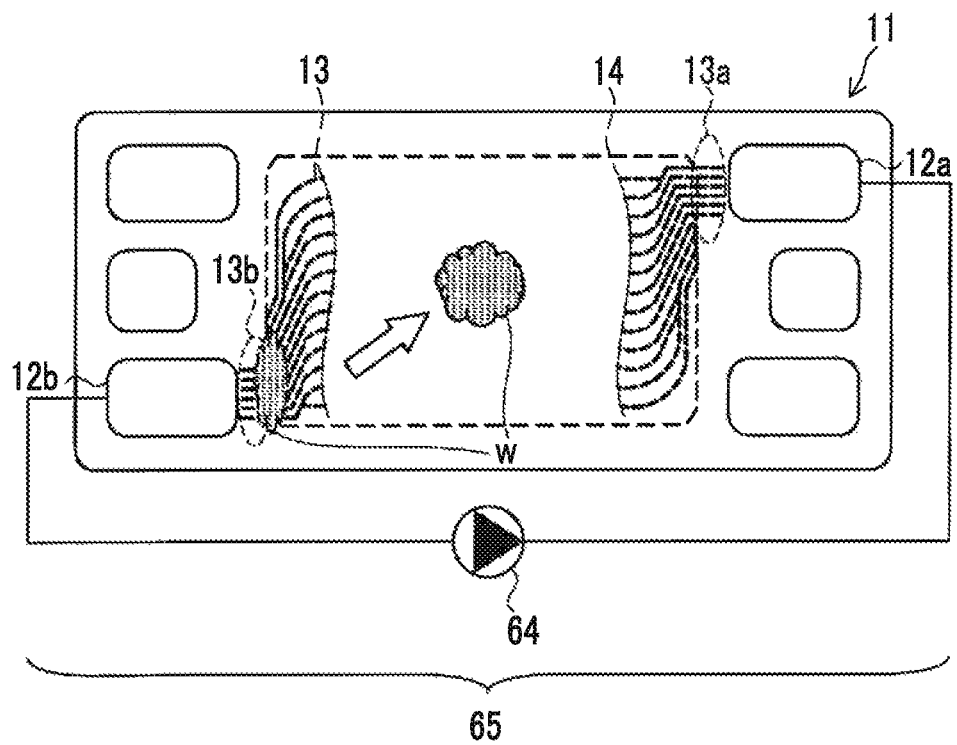
FIG. 5 is an explanatory view showing a state of the cell when step S110 of the flowchart of FIG. 3 is executed in the anode purge treatment.

FIG. 5 shows a state of the cell 11 when step S110 is executed in the anode purge treatment as described above. Water "w" in the cell 11, which was moved to the hydrogen channel outlet 13b in step S100, is then moved to a middle portion of the cell 11 in step S110.

According to the fuel cell system 100 of this embodiment as described above, the controller 20 rotates the hydrogen pump 64 in the positive direction so as to feed hydrogen gas into the fuel cell stack 10 (cells 11), and then rotates the hydrogen pump 64 in the negative direction so as to feed hydrogen gas into the fuel cell stack 10. As a result, water in each cell 11 can be moved to the middle portion of the cell 11. Therefore, both the hydrogen channel inlet 13a and the hydrogen channel outlet 13b of the cell 11 are less likely or unlikely to be clogged after completion of purge. In this embodiment, in particular, the amount of hydrogen fed into the fuel cell stack 10 through negative rotation of the hydrogen pump 64 is controlled to be smaller than the amount of hydrogen fed into the fuel cell stack 10 through positive rotation of the hydrogen pump 64, so that the water can be more reliably prevented from moving to the hydrogen channel inlet 13a. Therefore, the hydrogen channel inlet 13a and hydrogen channel outlet 13b of the cell 11 can be more effectively prevented from being clogged by the water.

In this embodiment, the hydrogen channel inlet 13a and the hydrogen channel outlet 13b of each cell 11 are less likely or unlikely to be clogged by water; therefore, when power generation of the fuel cell system 100 is started again, there is no need to perform hydrogen pressurization treatment as a countermeasure against freezing caused by clogging of the cell 11. As a result, the start-up time of the fuel cell system 100, and the time required for drainage treatment during stop of power generation of the fuel cell system 100 can be shortened, and freezing of the exhaust/drain valve 60, etc. can be avoided, thus assuring improved fuel economy.

Also, in this embodiment, since the hydrogen channel inlet 13a and the hydrogen channel outlet 13b of each cell 11 are less likely or unlikely to be clogged by water, the hydrogen channel inlet 13a and the hydrogen channel outlet 13b can be prevented from being frozen. As a result, it is possible to avoid a shortage of hydrogen in the cells 11 immediately after power generation is started next time, and curb degradation of the cells 11.

In this embodiment, the controller 20 rotates the hydrogen pump 64 in the positive direction for 60 sec., at the hydrogen flow rate Q1 having a stoichiometric ratio of 2.25, and then rotates the hydrogen pump 64 in the negative direction for 10 sec., at the hydrogen flow rate Q2 having a stoichiometric ratio of 2.5. Namely, the hydrogen pump 64 is rotated in the positive direction and the negative direction, at the hydrogen flow rates larger than the minimum hydrogen flow rate required for electric power generation of the fuel cell system 100. Therefore, the treatment time of the anode purge treatment can be shortened. Also, the controller 20 rotates the hydrogen pump 64 in the negative direction, for the shorter time at the larger hydrogen flow rate than those of rotation of the hydrogen pump 64 in the positive direction; therefore, the treatment time of the anode purge treatment can be further shortened.

Also, while the controller 20 needs to stop the hydrogen pump 64 once when it switches the direction of rotation of the hydrogen pump 64, the hydrogen pump 64 of this embodiment, which has been rotated in the positive direction during power generation, is further rotated in the positive direction with the stoichiometric ratio increased, and then the hydrogen pump 64 is rotated in the negative direction. Therefore, in this embodiment, the number of times the hydrogen pump 64 is stopped can be reduced, as compared with the case where the hydrogen pump 64, which has been rotated in the positive direction, is rotated in the negative direction, and then rotated in the positive direction. Accordingly, the anode purge treatment can be performed with high efficiency.

B. Modified Example

First Modified Example

In the illustrated embodiment, the controller 20 feeds hydrogen gas into the cells 11 through positive rotation of the hydrogen pump 64, and feeds hydrogen gas into the cells 11 through negative rotation of the hydrogen pump 64, at given hydrogen flow rates for predetermined lengths of time. On the other hand, the controller 20 may feed hydrogen gas into the cells 11 through positive rotation of the hydrogen pump 64 and feed hydrogen gas into the cells 11 through negative rotation of the hydrogen pump 64, in a stepwise fashion. For example, when the hydrogen pump 64 is rotated in the positive direction so as to feed hydrogen gas into the cells 11, the controller 20 may rotate the hydrogen pump 64 in the positive direction at a hydrogen flow rate Q1a for time t1a, and then rotate the hydrogen pump 64 in the positive direction at a hydrogen flow rate Q1b for time t1b, so as to feed hydrogen gas into the cells 11.

Second Modified Example

In the illustrated embodiment, the controller 20 performs the above-described anode purge treatment once, when power generation of the fuel cell system 100 is stopped. On the other hand, the controller 20 may perform the above-described anode purge treatment two or more times after power generation of the fuel cell system 100 is stopped.

Third Modified Example

In the illustrated embodiment, the controller 20 performs the anode purge treatment immediately after power generation of the fuel cell system 100 is stopped. On the other hand, the controller 20 may perform anode purge treatment after a predetermined time elapses from the time when power generation of the fuel cell system 100 is stopped. In this case, for example, the controller 20 monitors the ambient temperature of the fuel cell system 100 and the temperature of coolant in the fuel cell system 100, and carries out the above-described anode purge treatment when it determines, based on these items of information, that there is a possibility of freezing of water. More specifically, for example, the controller 20 initially determines whether the ambient temperature is equal to or lower than a predetermined temperature. Then, when the ambient temperature is equal to or lower than the predetermined temperature, the controller 20 determines whether the temperature of the coolant in the fuel cell system 100 is equal to or lower than a predetermined temperature. When the temperature of the coolant is equal to or lower than the predetermined temperature, the controller 20 carries out the anode purge treatment. The controller 20 may carry out the anode purge treatment when either one of the ambient temperature and the temperature of the coolant is equal to or lower than the corresponding predetermined temperature.

Fourth Modified Example

In the illustrated embodiment, the fuel cell system 100 is installed on the fuel cell vehicle. On the other hand, the fuel cell system 100 may be incorporated in stationary power-generating equipment. In this case, the main load is, for example, an air conditioner provided in an ordinary home or factory, or electrical equipment, such as a machine tool.

Fifth Modified Example

In the illustrated embodiment, the hydrogen channel inlet 13a and the hydrogen channel outlet 13b have the comb-teeth-shaped structure. On the other hand, only one of the hydrogen channel inlet 13a and the hydrogen channel outlet 13b may have the comb-teeth-shaped structure. Also, the shape of the hydrogen channel inlet 13a and the hydrogen channel outlet 13b is not limited to the comb-teeth shape, but the inlet 13a and the outlet 13b may be constructed in the form of dot-like or circular protrusions mounted in space.

The present disclosure is not limited to the above embodiment and modified examples, but may be realized with various arrangements, without departing from its principle. For example, the technical features in the embodiment and modified examples, which correspond to the technical features described in the "SUMMARY" above, may be replaced or combined as appropriate, so as to solve a part or all of the above-described problems, or achieve a part of or all of the above-described effects. Also, the technical features may be deleted as appropriate, if they are not described as being essential to the disclosure in this specification.

What is claimed is:

1. A fuel cell system comprising:
    a fuel cell stack having a plurality of cells each having hydrogen channels through which hydrogen gas flows, a hydrogen channel inlet that allows the hydrogen gas to flow into the hydrogen channels, and a hydrogen channel outlet that allows the hydrogen gas to flow out from the hydrogen channels;
    a main load to which electric power is supplied from the fuel cell stack;
    a circulation passage that connects the hydrogen channel inlet with the hydrogen channel outlet, such that the hydrogen gas supplied to the fuel cell stack is circulated through the circulation passage;
    a hydrogen pump provided in the circulation passage and configured to rotate in a selected one of a positive direction corresponding to a normal feeding direction of the hydrogen gas, and a negative direction opposite to the positive direction; and
    a controller configured to control the hydrogen pump,
    wherein the controller is configured to rotate the hydrogen pump in the positive direction so as to feed the hydrogen gas in a predetermined first hydrogen amount into each of the cells through the hydrogen channel inlet, at a first hydrogen flow rate that is larger than a minimum hydrogen flow rate required for power generation, and then rotate the hydrogen pump in the negative direction so as to feed the hydrogen gas in a second hydrogen amount that is smaller than the first hydrogen amount, into each of the cells through the hydrogen channel outlet, during a period from a time when supply of electric power from the fuel cell stack to the main load is stopped, to a time when supply of electric power to the main load is started next time.

2. The fuel cell system according to claim 1, wherein at least one of the hydrogen channel inlet and the hydrogen channel outlet comprises a plurality of straight flow channels that are arranged in parallel at regular intervals.

3. The fuel cell system according to claim 1, wherein a ratio of the first hydrogen flow rate at which the hydrogen gas is fed during rotation of the hydrogen pump in the positive direction, to the minimum hydrogen flow rate required for power generation in the fuel cell system, is in a range of 1.5 to 3.0, where the minimum hydrogen flow rate is taken as 1.

4. The fuel cell system according to claim 1, wherein a second hydrogen flow rate at which the hydrogen gas is fed during rotation of the hydrogen pump in the negative direction is larger than the first hydrogen flow rate during rotation of the hydrogen pump in the positive direction.

5. The fuel cell system according to claim 1, wherein the controller rotates the hydrogen pump in the negative direction for a shorter length of time than that of rotation of the hydrogen pump in the positive direction.

6. A method of controlling a fuel cell system, the fuel cell system including a fuel cell stack having a plurality of cells each having hydrogen channels through which hydrogen gas flows, a hydrogen channel inlet that allows the hydrogen gas to flow into the hydrogen channels, and a hydrogen channel outlet that allows the hydrogen gas to flow out from the hydrogen channels, a main load to which electric power is supplied from the fuel cell stack, a circulation passage that connects the hydrogen channel inlet with the hydrogen channel outlet, such that the hydrogen gas supplied to the fuel cell stack is circulated through the circulation passage, and a hydrogen pump provided in the circulation passage and configured to rotate in a selected one of a positive direction corresponding to a normal feeding direction of the hydrogen gas, and a negative direction opposite to the positive direction, the method comprising:
    rotating the hydrogen pump in the positive direction so as to feed the hydrogen gas in a predetermined first hydrogen amount into each of the cells through the hydrogen channel inlet, at a hydrogen flow rate that is larger than a minimum hydrogen flow rate required for power generation, during a period from a time when supply of electric power from the fuel cell stack to the main load is stopped, to a time when supply of electric power to the main load is started next time; and then rotating the hydrogen pump in the negative direction so as to feed the hydrogen gas in a second hydrogen amount that is smaller than the first hydrogen amount, into each of the cells through the hydrogen channel outlet, during the period.

7. A fuel cell system comprising:

a fuel cell stack having a plurality of cells each having hydrogen channels through which hydrogen gas flows, a hydrogen channel inlet that allows the hydrogen gas to flow into the hydrogen channels, and a hydrogen channel outlet that allows the hydrogen gas to flow out from the hydrogen channels;

a main load to which electric power is supplied from the fuel cell stack;

a circulation passage that connects the hydrogen channel inlet with the hydrogen channel outlet, such that the hydrogen gas supplied to the fuel cell stack is circulated through the circulation passage;

a hydrogen pump provided in the circulation passage and configured to rotate in a selected one of a positive direction corresponding to a normal feeding direction of the hydrogen gas, and a negative direction opposite to the positive direction; and a controller programmed to control the hydrogen pump, wherein the controller is programmed to rotate the hydrogen pump in the positive direction so as to feed the hydrogen gas in a predetermined first hydrogen amount into each of the cells through the hydrogen channel inlet, at a first hydrogen flow rate that is larger than a minimum hydrogen flow rate required for power generation, and then rotate the hydrogen pump in the negative direction so as to feed the hydrogen gas in a second hydrogen amount that is smaller than the first hydrogen amount, into each of the cells through the hydrogen channel outlet, during a period from a time when supply of electric power from the fuel cell stack to the main load is stopped, to a time when supply of electric power to the main load is started next time.

* * * * *